UNITED STATES PATENT OFFICE.

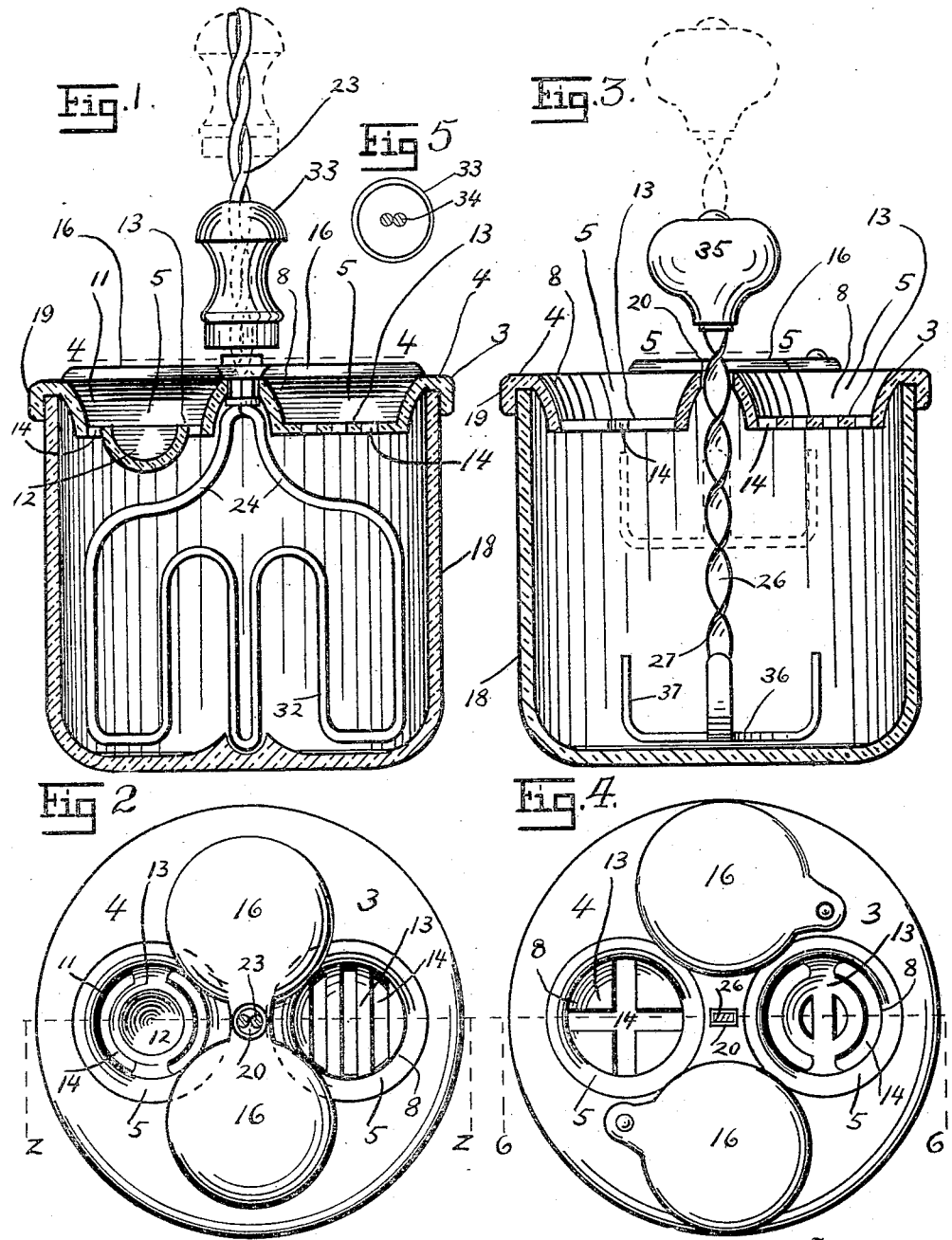

PAUL TRIPKE, OF JERSEY CITY, NEW JERSEY.

COMBINED EGG SEPARATOR AND BEATER.

1,282,148.  Specification of Letters Patent.  Patented Oct. 22, 1918.

Application filed December 20, 1915.  Serial No. 67,786.

*To all whom it may concern:*

Be it known that I, PAUL TRIPKE, citizen of the United States, and resident of Jersey City, in the county of Hudson and State of New Jersey, have invented certain new and useful Combined Egg Separators and Beaters, of which the following is a specification.

My invention relates to a new article of manufacture; and the object is the combination of an egg separator beater closure and a beater or mixer mechanism, wherein the closure is so shaped with egg-separator-formations that the separation of the egg can or may be performed without necessitating the removal of the beater or mixer mechanism, thus saving the time of handling and separating the parts for separate uses.

Referring to the drawings:

Figure 1,—is a vertical sectional elevation of my new article of manufacture egg separator-beater closure on line Z Z Fig. 2, showing the same adapted to coact with a traveling knob operated beater or mixer mechanism (shown in full lines) duplex lid shown closed and in full lines.

Fig. 2,—is a plan sectional view on line 4—4 Fig. 1—lid shown duplex and open,

Fig. 3,—is another vertical sectional elevation of my new article of manufacture egg separator beater closure on line 6—6 Fig. 4, showing same adapted to coact with a reciprocated operated beater or mixer mechanism (shown in full lines) one lid shown in full lines and open.

Fig. 4,—is a plan sectional view on line 5—5 Fig. 3, the lids shown single and open.

Fig. 5,—is a detached bottom view of the operating handle as shown in Fig. 1. Like letters refer to like parts throughout the specification.

Numeral 3 represents my new article of manufacture as adapted to co-act with beater or mixer mechanisms, see Figs. 1, and 3 for example.

This article of manufacture comprises a closure or cover 4 made preferably of glass, although other materials can be used.

The surface of this closure is integrally formed with a plurality of egg separator-formations 5 which can be used in a variety of shapes to be clearly described hereafter.

The essential feature of my invention is the arrangement of these egg separator-formations around the beater mechanism so as not to interfere with the operation of said mechanism, thereby making it possible to use one or all of the formations 5 for separating eggs without removing the beater mechanism or parts thereof as has been the case with other constructions.

These egg-separator-formations 5 of the closure have all a similar construction as to the bowl or dish shape portion; but bowl 11, Fig. 1 is provided with an additional lower bowl 12 formed in the center of the bottom 13 thereof.

The bottom 13 of the bowl is pierced with orifices 14 (see all figures, except Fig. 5) which may be of any size, number or shape.

When lower bowl 12 is used orifices 14 are formed around same in the extended portion of the bottom 13 see Figs. 1 and 2.

I do not confine myself to the number of egg-separator-formations 5 in said closure as one or more can and may be used according to the size of the closure.

I usually provide the egg-separator-formations 5 with pivoted covers or lids 16; some made duplex (see Figs. 1 and 2) and some single (see Fig. 4). I may pivot these lids 16 on the closure as shown in Figs 3 and 4 or simply as shown in Figs 1 and 2 pass the center or pivoting hole of the duplex lid over the operating stems or rods of the beater mechanism, and allow said lid to freely turn around on same.

By turning these lids to the right or left the formations 5 of the closure will be covered or closed against the beaten or mixed fluid splashing up through the orifices 14 on to the outside of the closure, during the operation of the beater mechanism.

I am aware that a cover-plate can be used having a central hole or opening for passing same over the beater mechanism and covering the formations 5 of the closure.

The closure thus provided with egg separator formations 5 is placed upon the receptacle 18, preferably made of glass, of any suitable shape.

As an illustration of how the closure can be secured on the container 18 I, in Figs. 1 and 3, have shown the closure edge provided with a right angle flange 19 which prevents the closure from falling off said container, as however other means will accomplish the same result; for instance the bayonet type.

I am not confined to any particular device.

The closure is provided at the center with an orifice 20 which in Figs. 1 and 2 is round to receive the spiral or twisted stem 23 of beater mechanism 24, and in Figs. 3—4 elongated to receive the spiral or twisted stem of the beater mechanism 27.

The twisted stem 23 is provided with beater arms 32 and is revolved by the traveling knob 33, suitably provided with actuating holes 34 (see Fig. 5) which give the rotary motion to the beater mechanism by traveling up and down on said stem 23.

The beater mechanism 27 in Fig. 3 is operated by taking hold of the handle 35 pivotally mounted on the twisted stem 26 which is provided with a dasher 36 having beater arms 37, and by reciprocating said rod up and down in the elongated slot 20 in the closure is given a rotary back and forth movement by coming in contact with the walls of said slot.

To use my new article of manufacture place the closure 4 with its egg-separator-formations and particular beater mechanism on the container 18. Then open the formations 5 by shoving aside the covers 16, and break an egg over a formation so that its contents will fall into the same.

If an egg is broken over bowl 11 having a lower bowl 12 the yolk of the egg (being heavier) will settle in the said lower bowl and fill same, while the white portion being of less specific gravity will remain above and flow through the orifices 14 into the container.

If however the egg is broken over a formation without a lower bowl its contents will fall on the bottom of same; the white of the egg will then pass downwardly through the orifices 14, while the yolk being of a more solid nature and compactly held together is prevented from passing through the orifices 14.

After the egg separation has been accomplished the closure is removed with its beater mechanism and the separated yolk poured out of the egg separator formations into any suitable vessel.

Then the closure with its beater mechanism is replaced on the container and secured if necessary.

The covers 16 are then closed over the formations 5 and the beater mechanisms operated in their particular manner, and the separated white of the egg in the container will thus be thoroughly beaten or mixed.

If the closure is not securely fastened to the container it is held down on same (when the beater mechanism is in operation) by the pressure of the hand (see Figs. 1-3).

It will thus be seen from the foregoing description that the operation of any of the beater mechanisms do not interfere with the egg separating operation nor does the egg separating interfere with the beater mechanism operation, both being in location and operation independent of each other.

The parts can be easily separated for cleansing, which thereby renders the article highly sanitary.

By duplicating the formations 5 in the closure a speedier separation of the egg is accomplished—thus while waiting for a formation to separate an egg the other can readily be put into service or use.

I do not confine myself to the shape of the orifices 14 in the bowls 8 as I am aware that other shapes can do the same work of separating the egg.

Nor do I confine myself to the particular shape of the egg-separator-formations as I am aware other shapes will produce the same results. Nor do I confine myself to the particular beater mechanisms shown as I am aware others can be used. But what I claim is:—

1. A new article of manufacture, a beater-closure provided integrally on its surface with a plurality of egg-separator formations, an orifice piercing said closure between said formations, a beater mechanism adapted to engage with and to be reciprocated through said orifice, said beater mechanism arranged on said closure by said orifice so as to prevent interfering with the said formations in operation.

2. A new article of manufacture, the combination of a beater-closure having an egg separator formation integrally formed in its surface, an orifice piercing said surface near said formation and a beater mechanism adapted to engage or co-act with said orifice, said beater mechanism arranged on said closure by said orifice so as to prevent interfering with said formation in operation.

3. A new article of manufacture, the combination of a beater-closure provided integrally on its surface with an egg-separator formation, an orifice piercing said surface near said formation, a beater mechanism, a spiral or twisted stem of said beater mechanism said stem adapted to be reciprocated through said orifice, said beater mechanism arranged on said closure so as not to interfere with the said formation.

4. A new article of manufacture, the combination of a beater-closure provided integrally with a plurality of egg-separator-formations on its surface, an orifice piercing said surface between said formations, a beater mechanism having a spiral or twisted stem, said stem adapted to engage with and rotate in said orifice, said formation and said beater-mechanism arranged on said closure so as to be independent of each other's operations.

5. A new article of manufacture, a beater-closure provided integrally on its surface with an egg-separator-formation, a container, said closure adapted to rest on said container, an orifice piercing said closure near said formation, a lid pivotally placed on said closure and adapted to open and close said formation, a beater mechanism having a spiral or twisted stem, said stem adapted to engage with said orifice and also adapted to rotate in said container, said beater-mechanism arranged on said closure so as not to interfere with said formation.

6. A new article of manufacture, a beater-closure provided integrally with a plurality of egg separator formations, a container, said closure adapted to rest on said container, an orifice piercing said closure between said formations, lids pivotally placed on said closure and adapted to open and close said formations, a beater mechanism having a spiral or twisted stem, said stem adapted to engage with and to be reciprocated through said orifice to give said beater mechanism a rotary motion within the said container, said formation and said beater mechanism arranged on said closure so as to be independent of each other's operations.

Signed at Jersey City, in the county of Hudson and State of New Jersey, this 17th day of December, A. D. 1915.

PAUL TRIPKE.

Witnesses:
H. F. BEHAN,
FRED KUHLMANN.

Copies of this patent may be obtained for five cents each, by addressing the "Commissioner of Patents, Washington, D. C."